Nov. 28, 1967  O. H. UTRUP ETAL  3,354,636
CIRCLE JET ENGINE

Filed June 9, 1966 6 Sheets-Sheet 1

Orville H. Utrup
Kathryn M. Utrup
INVENTORS

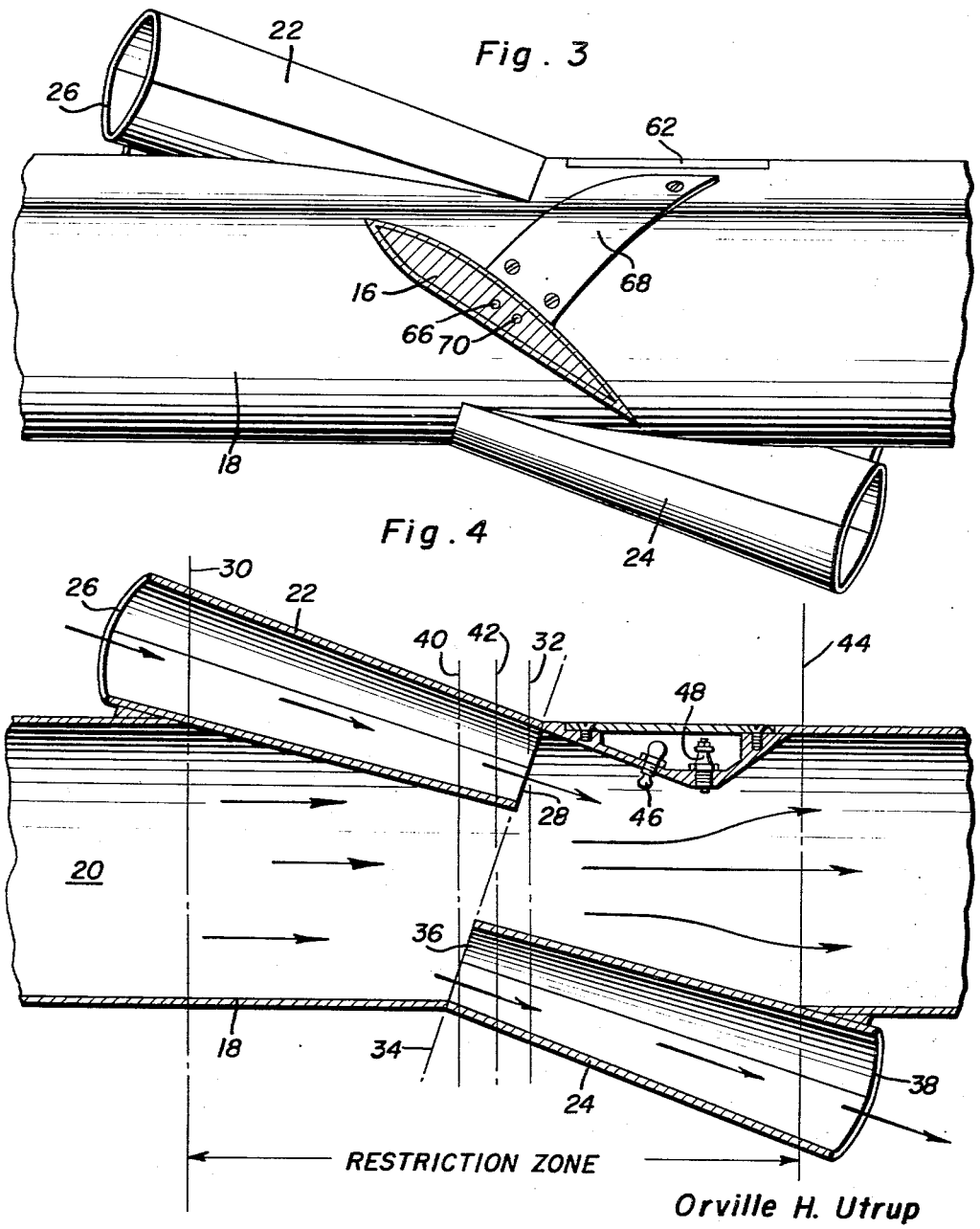

Nov. 28, 1967  O. H. UTRUP ETAL  3,354,636
CIRCLE JET ENGINE

Filed June 9, 1966  6 Sheets-Sheet 3

Orville H. Utrup
Kathryn M. Utrup
INVENTORS

BY *Clarence A. O'Brien*
*and Harvey B. Jackson*
Attorneys

Nov. 28, 1967   O. H. UTRUP ETAL   3,354,636
CIRCLE JET ENGINE

Filed June 9, 1966   6 Sheets-Sheet 4

Orville H. Utrup
Kathryn M. Utrup
INVENTORS

Orville H. Utrup
Kathryn M. Utrup
INVENTORS

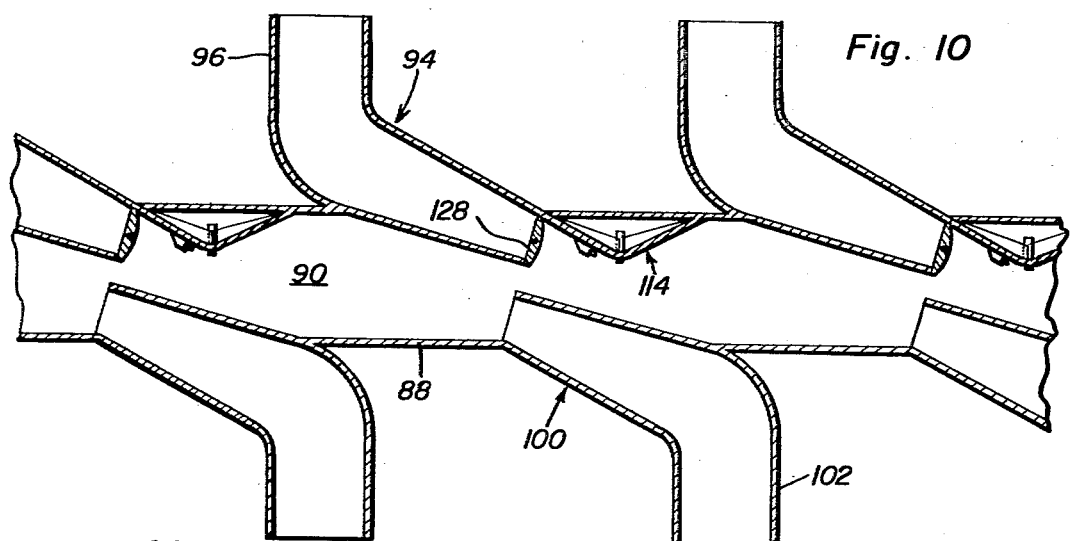
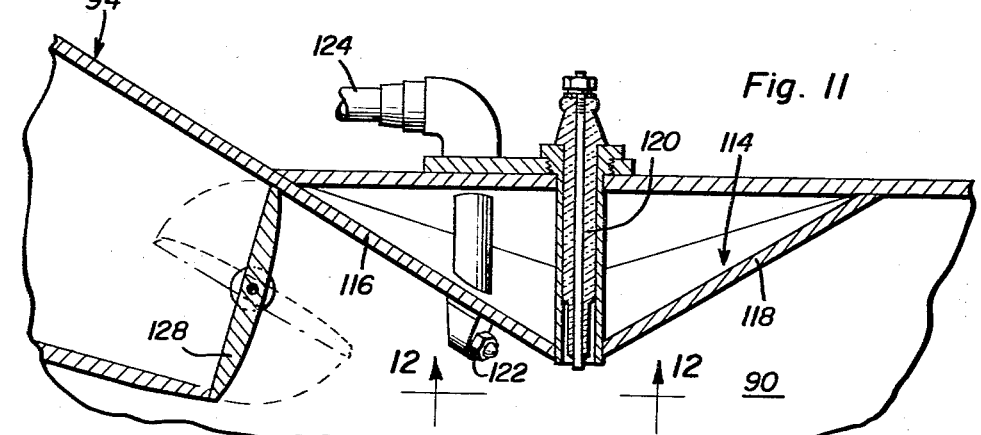
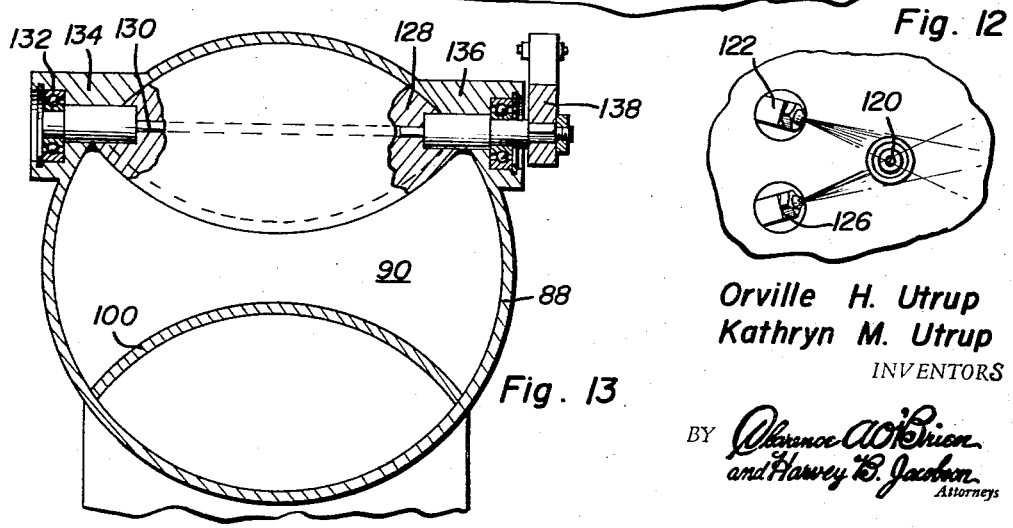

United States Patent Office 3,354,636
Patented Nov. 28, 1967

3,354,636
CIRCLE JET ENGINE
Orville H. Utrup and Kathryn M. Utrup, both of 2626 Alvarado NE., Albuquerque, N. Mex. 87110
Filed June 9, 1966, Ser. No. 556,341
15 Claims. (Cl. 60—39.35)

This application is a continuation-in-part of our prior copending application U.S. Ser. No. 402,967, filed Oct. 9, 1964 and pertains to a reaction type of combustion engine.

The present invention relates to engines, the reaction thrust of which may be utilized to either directly propel a vehicle or aircraft or to produce rotation of propeller blades through which thrust is developed. Thus, the principles of the present invention are applicable to propeller driving engines, jet engines as well as rocket engines.

The unique feature of the present invention regardless of the type of engine within which it is embodied, resides in the formation of a continuous or endless flow path of combustion products whereby fuel mixture charges introduced at spaced locations along the flow path undergo a regenerating combustion cycle. Thus, a preferred embodiment of the invention employs a toroidal combustion chamber establishing a circular or toroidal flow path and is provided with a plurality of circumferentially spaced intake ducts through which an inflow of air is conducted for mixing with a charge of fuel ignited adjacent to the inflow ducts. Also, a plurality of exhaust nozzles are provided through which combustion products are partially discharged at spaced locations along the toroidal flow path. During operation of the engine, a high velocity flow of combustion products along the toroidal flow path induces the inflow of air through the intake ducts producing compression of the fuel mixture when ignited necessary to sustain the high velocity flow of combustion products. The partial discharge of the combustion products through the exhaust nozzles produces reaction thrust directed either axially of the flow path in connection with a non-rotatable type of engine or producing rotation of the toroidal combustion chamber itself in connection with a rotatable type of engine. The arrangement and location of the intake ducts and exhaust nozzles is such as to produce circumferentially spaced restriction zones within the toroidal combustion chamber so as to increase the velocity of the combustion products and compression of the fuel mixture prior to ignition.

One of the important objects of the present invention therefore is to provide a combustion engine having a toroidal combustion chamber through which a continuous flow path is established for combustion products formed from regenerating combustion cycles.

An additional object of the present invention in accordance with the foregoing object is to produce the continuous regenerating combustion cycle aforementioned within a toroidal combustion chamber by providing a plurality of circumferentially spaced intake ducts disposed at an acute angle to the toroidal flow path of the combustion products and a plurality of circumferentially spaced exhaust nozzles through which partial discharge of the combustion products occurs, the intakes ducts and exhaust nozzles forming restriction zones within the combustion chamber through which the combustion products flow as they approach the fuel injection and ignition region.

A still further object of the present invention is to provide a toroidal combustion chamber for a combustion engine having circumferentially spaced intake and exhaust ducts through which an inflow of air is induced and partial discharge of combustion products conducted respectively, the toroidal combustion chamber also mounting baffle means which prevent back flow of combustion products into the intake ducts.

Yet another object in accordance with the foregoing object, is to provide valve or shutter devices for the intake ducts whereby rocket engine operation is accommodated when an oxidizing fluid is introduced into the combustion chamber for mixture with the fuel prior to ignition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged partial sectional view taken substantially through a plane indicated by section line 3—3 in FIGURE 2.

FIGURE 4 is an enlarged partial sectional view taken substantially through a plane indicated by section line 4—4 of FIGURE 2.

FIGURE 10 is a developed sectional view of a portion of the engine shown in FIGURES 7 through 9.

FIGURE 11 is an enlarged sectional view of a portion of the engine shown in FIGURE 10.

FIGURE 12 is a bottom view of an interior portion of the engine as viewed from section line 12—12 in FIGURE 11.

FIGURE 13 is an enlarged partial sectional view taken substantially through a plane indicated by section line 13—13 in FIGURE 8.

Figure 1:
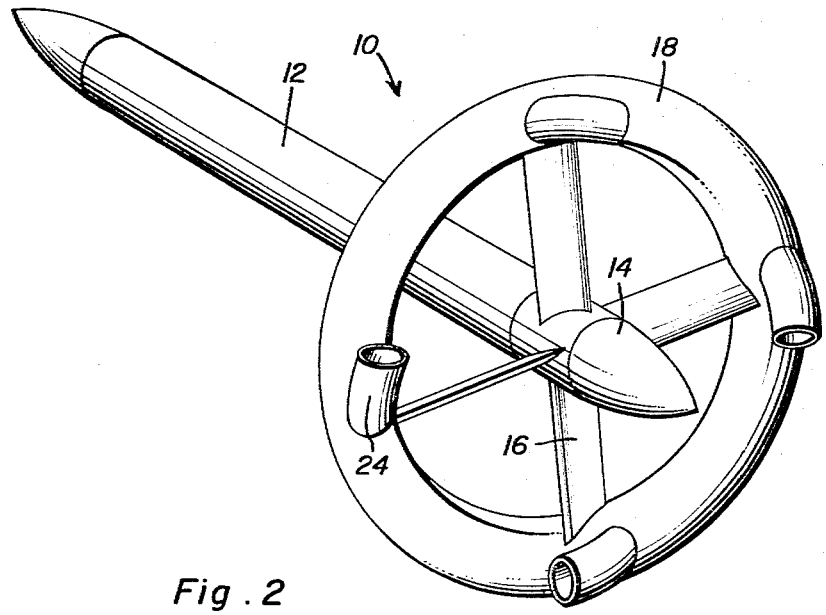
FIGURE 1 is a perspective view showing one form of engine constructed in accordance with the present invention.

Referring now to the drawings in detail, FIGURE 1 illustrates one form of engine generally referred to by reference numeral 10, this engine being of the rotatable type. The engine is adapted to propel a vehicle such as an aircraft in a direction parallel to a rotational axis extending through an axially elongated tubular housing 12 which is fixedly mounted in any suitable manner on the vehicle being propelled. Rearwardly mounted by the tubular housing 12, is a propeller hub 14 to which a plurality of radially extending propeller blades 16 are connected for rotation therewith about the rotational axis aforementioned. The propeller blade 16 may be of the fixed pusher type as shown or may be of the variable pitch type if desired. The radially outer ends of the propeller blades are connected to and thereby mount an endless tubular member 18 which is in the form of a torus having a center lying on the rotational axis of the engine. Accordingly, during operation of the engine, the tubular toroidal member 18 rotates with the propeller blades 16 about the rotational axis. The propeller blades being of the pusher type thereby develop axial thrust in a forward direction to propel the vehicle to which the tubular housing 12 is attached.

Referring now to FIGURES 2, 3, 4 and 6, it will be observed that the tubular member 18 encloses therewithin a toroidal combustion chamber 20 through which a continuous flow of combustion products is conducted along a circular flow path of substantially constant flow area except for the spaced restriction zones one of which is more clearly shown in FIGURE 4. Each restriction zone is defined between an intake duct 22 connected to the tubular member 18 on the forward side thereof and an exhaust nozzle 24 connected to the tubular member 18 on the rearward side thereof. The intake duct is elliptical in cross-section and defines a flow area which decreases in one direction from its inlet end 26 externally of the tubular member 18 to an outlet end 28 internally of the tubular member 18. Thus, the flow area of the tubular member 18 is reduced by the intake duct 22 projecting thereinto between the locations 30 and 32 as shown in FIGURE 4. Also, the intake duct 22 is disposed at an acute angle to the toroidal flow path established through the tubular member 18 for the combustion products, the acute angle being preferably less than 30 degrees.

The outlet end 28 of the intake duct 22 lies in a diagonal plane intersecting the tubular 18 along the reference stage line 34 shown in FIGURE 4 from which the exhaust nozzle 24 also extends at an acute angle to the toroidal flow path within the combustion chamber 20. The inlet end 36 of the exhaust nozzle lies entirely within the tubular member 18 so that a portion of the combustion products will enter the exhaust nozzle for discharge from the outlet end 38 thereof externally of the tubular member on the rearward side thereof. It will therefore be apparent that the exhaust nozzle 24 overlaps the intake duct along the toroidal path of the combustion chamber between the locations 40 and 32. Further, the flow area defined by the exhaust nozzle 24 is elliptical just as in the case of the intake duct 22 but increases in the direction of flow. Elliptical cross-sections are selected for the intake duct and exhaust nozzle in order to avoid too severe a restriction at the throat section 42 where the intake duct and exhaust nozzle overlap. It will be appreciated therefore that the intake duct and exhaust nozzle form a venturi restriction including the converging section between the location 30 and the throat 42 and a diverging section between the throat 42 and the location 44 along the toroidal flow path in the direction of flow. Thus, there will be an increase in velocity of the combustion products along the toroidal flow path as they enter each restriction zone and approach the throat section 42. A high velocity discharge of a portion of the combustion products is thereby ejected from the exhaust nozzle producing a reaction thrust which imparts rotation to the tubular member 18 and the propeller blade 16 connected thereto. Further, the high velocity of the combustion products and its internal heat produce compression of the fuel mixture introduced into the diverging section of the restriction zone.

Rotation of the tubular member 18 and the high velocity of the combustion products which flow through the throat section 42 of the restriction zone, induces an inflow of air through the intake duct 22 because of the dynamic pressure resulting from rotation of the tubular member 18 and the reduction in static pressure at the inlet end 28 of the intake duct resulting from the increase in velocity of the combustion products within the restriction zone of the combustion chamber. The inflow of air when entering the combustion chamber at the outlet end 28 of the intake duct mixes with fuel introduced by the fuel injection nozzle 46 so that a combustible mixture may be ignited by the spark plug device 48 located just downstream of the fuel injecting nozzle 46 as seen in FIGURE 4. It will therefore be apparent that toroidal combustion chamber is charged with a combustible mixture within the diverging section of each restriction zone to produce a regenerating combustion cycle sustaining a continuous and high velocity flow of combustion products along the toroidal flow path of the combustion chamber, a portion of which is continuously discharged through the exhaust nozzles 24 as aforementioned.

Figure 2:
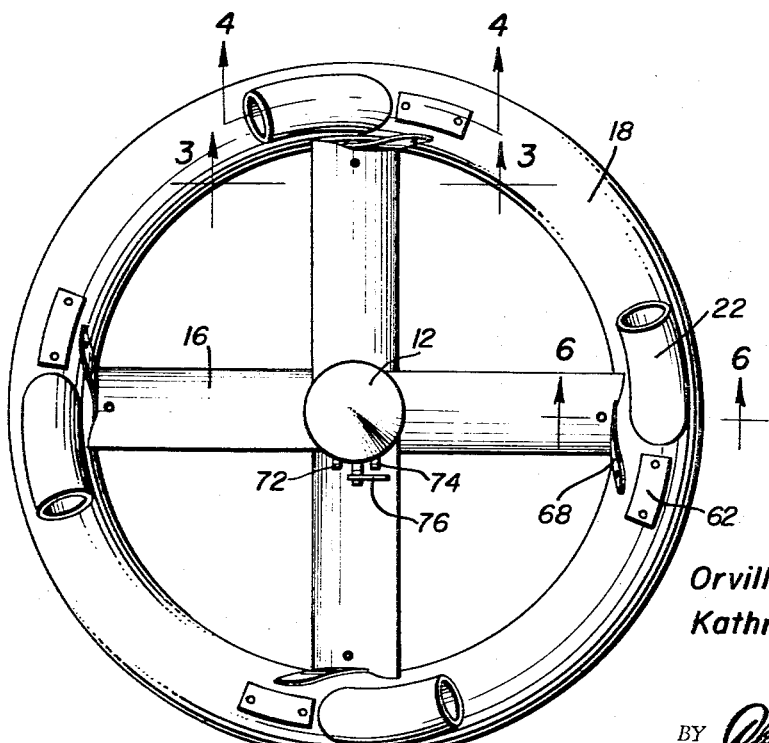
FIGURE 2 is a front elevational view of the engine shown in FIGURE 1.
Figure 5:
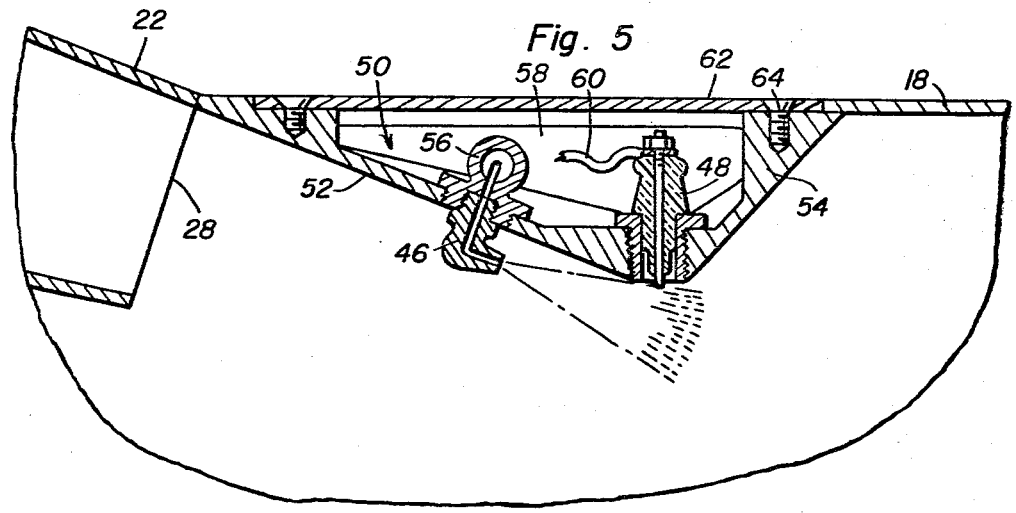
FIGURE 5 is an enlarged sectional view of a portion of the engine shown in FIGURE 4.
Figure 6:
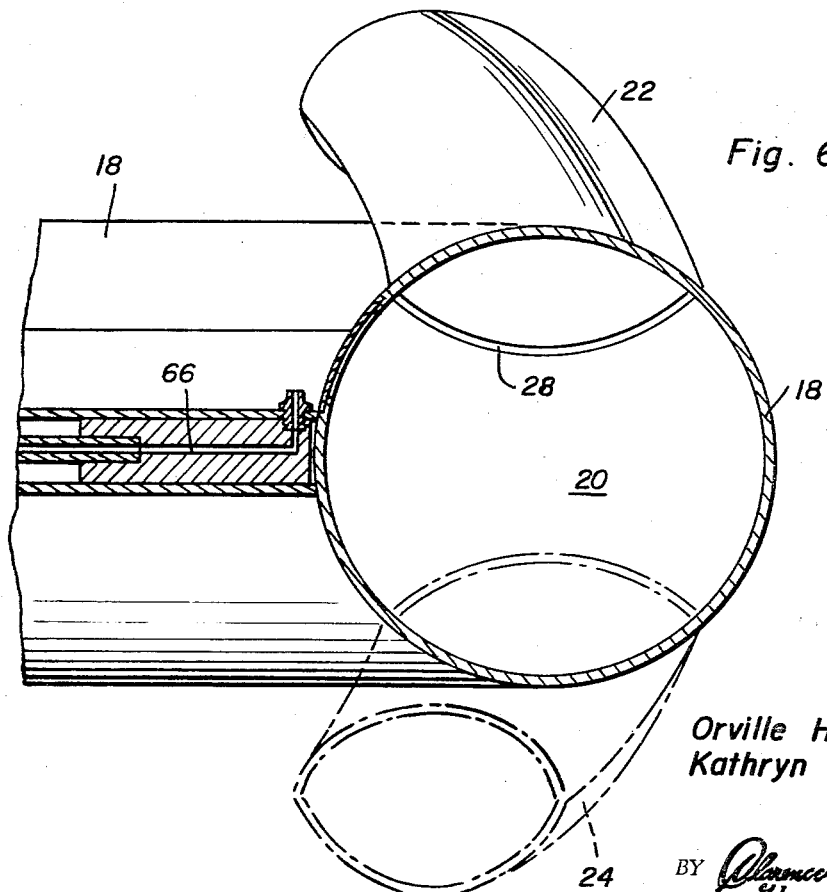
FIGURE 6 is an enlarged partial sectional view taken substantially through a plane indicated by section line 6—6 in FIGURE 2.

As more clearly seen in FIGURE 5, a baffle member 50 is mounted just downstream of the outlet end 28 of the intake duct within each restriction zone on the forward side of the tubular member 18. Each baffle member 50 includes deflecting surfaces 52 and 54 which converge into the combustion chamber toward an apex from which the fuel ignition spark plug device 48 projects. The deflecting surface 52 of the baffle member therefore mounts the fuel nozzle 46 in spaced relation to the spark plug device 48 within the inflow path of air entering the combustion chamber from the outlet end 28 of the intake duct 22. The baffle member 50 not only mounts the fuel nozzle and spark plug devices in the proper spatial relationship, but also provides the deflecting surfaces 52 and 54 which prevent back flow of combustion products into the intake duct as a result of combustion produced by ignition of the fuel mixture at the location of the spark plug device 48. Thus, the combustible charge ignited by the spark plug device 48 is deflected by the surfaces 52 and 54 and by the inflow of air into the toroidal flow path of the combustion products continuously circulated through the tubular member 18. The fuel is supplied to the nozzle 46 through the conduit fitting 56 projecting into the baffle cavity 58 which also receives the conductor 60 through which electrical energy is supplied to the spark plug device 48. The baffle cavity is closed by a closure element 62 secured by fasteners 64 to the baffle member. Accordingly, easy access to the baffle cavity 58 is provided in order to remove or replace the nozzle and spark plug devices when necessary. The conduit fitting 56 connects the fuel injecting nozzle 46 to a fuel line 66 which extends through an adjacent propeller blade 16 and communicates with the fitting 56 below the cover 68. The conductor 60 through which electrical energy is supplied to the spark plug also extends through the adjacent propeller blade formed with a passage 70 therefor as shown in FIGURE 3. The fuel and electrical lines extend from the propeller blades into the tubular housing 12 to the terminals 72 and 74 as shown in FIGURE 2. Accordingly, a supply of fuel (not shown) and a source of electrical energy (not shown) may be respectively connected to the terminals 72 and 74. Also, the supply of fuel to the fuel injecting nozzle 46 may be regulated by a metering valve (not shown) controlled through the control level 76 as shown in FIGURE 2.

Figure 7:
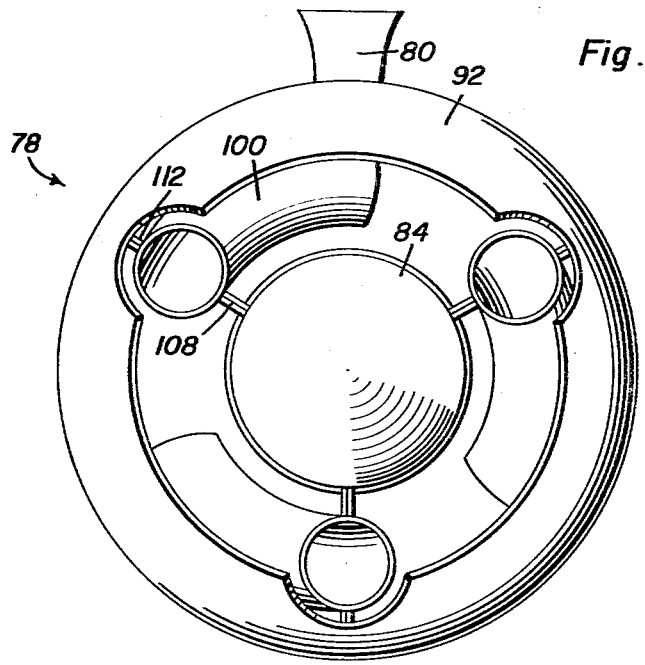
FIGURE 7 is a rear elevational view of another form of engine constructed in accordance with the present invention.
Figure 8:
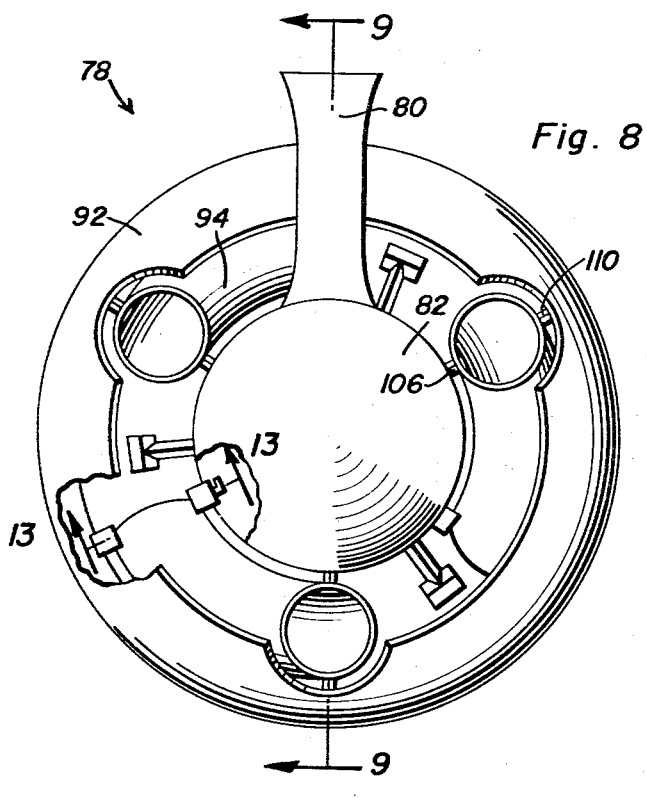
FIGURE 8 is a front elevational view of the engine shown in FIGURE 7.
Figure 9:
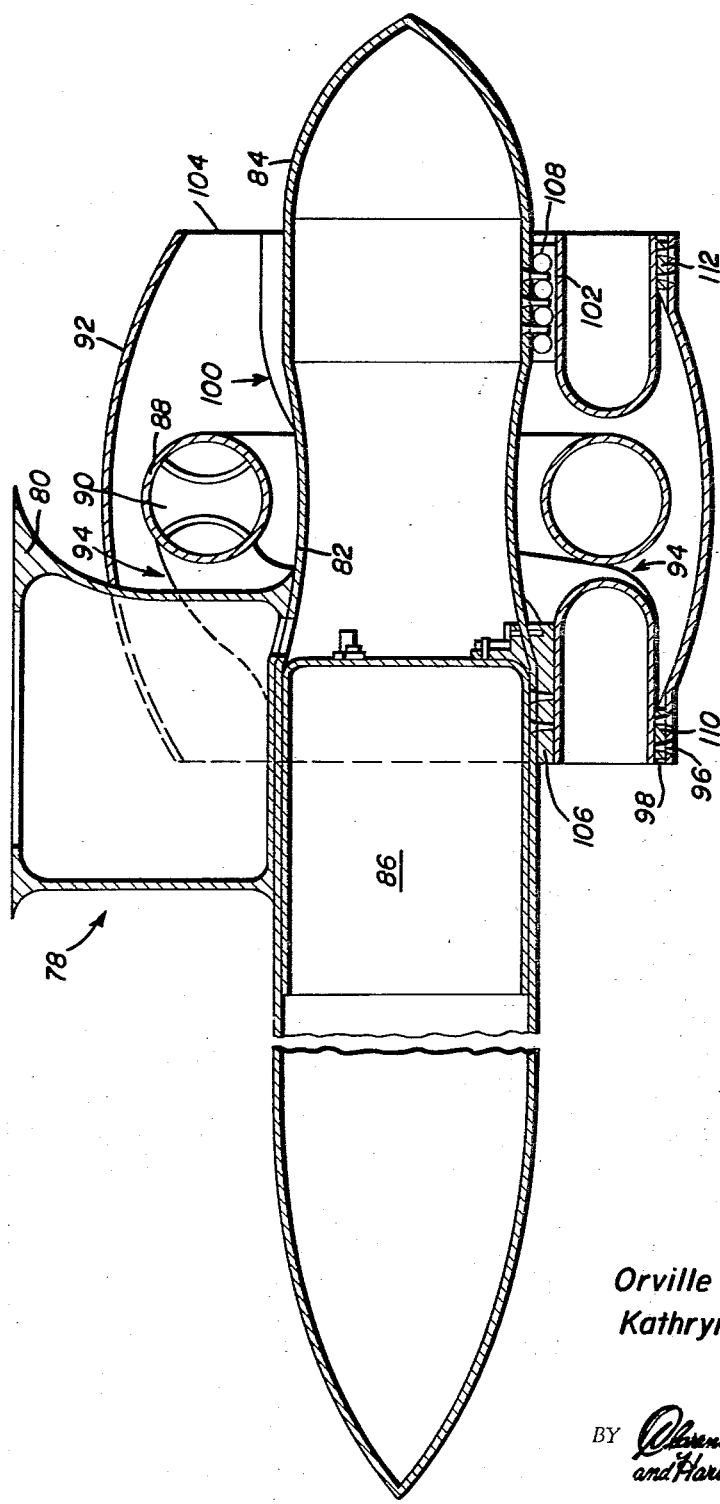
FIGURE 9 is a side sectional view of the engine taken substantially through a plane indicated by section line 9—9 in FIGURE 8.

The same operating principles as described in connection with the engine 10 illustrated in FIGURES 1 through 6, may be applied to a non-rotatable type of engine wherein thrust is produced directly from the partial discharge of combustion products. An engine of this type is shown in FIGURES 7 through 9 and is generally referred to by reference numeral 78. The engine 78 may be attached to the vehicle or aircraft with which it is associated by means of a mounting strut 80 connected to an axially elongated tubular member 82 having a tail cone 84 at a rear end thereof and enclosing an oxidizer tank 86 within a forward portion thereof. Concentrically mounted about the tubular mounting member 82 between the oxidizer tank 86 and the tail cone 84, is a circular tubular member 88 forming a toroidal combustion chamber 90 therewithin. An annular engine cover 92 encircles the tubular member 88 and extends axially therefrom in opposite directions. A plurality of circumferentially spaced intake ducts 94 are secured to the tubular member 88 on the forward side thereof, each intake duct having an axial inlet section 96 terminating at the forward axial end 98 of the engine cover 92. Similarly, a plurality of circumferentially spaced exhaust nozzles 100 are connected to the rearward side of the tubular member 88, each exhaust nozzle having an axial outlet section 102 terminating at the rearward axial end 104 of the engine cover. The axial sections of the intake ducts and exhaust nozzles are respectively positioned by front and rear mounts 106 and 108 on the tubular mounting member 82 of the engine while forward and rear cover mounts 110 and 112 support the engine cover 92 in proper position on the axial sections 96 and 102 of the intake ducts and exhaust nozzles.

As shown in FIGURE 10, the intake ducts and exhaust nozzles are connected to the tubular member 88 in order to supply an inflow of air and partially discharge combustion products and form restriction zones as hereinbefore described in connection with the engine 10. A back pressure baffle member 114 is therefore associated with each intake duct occupying the same relationship thereto as hereinbefore described in connection with the baffle member 50 and intake duct 22. Thus, the baffle member 114 as more clearly shown in FIGURE 11 includes the deflecting surfaces 116 and 118 which converge into the combustion chamber toward an apex through which the ignition spark plug device 120 is exposed for igniting a combustible fuel introduced into the toroidal combustion chamber 90 by one of the nozzle devices 122 extending from the deflecting surface 116 of the baffle member between the spark plug device and the outlet end of the intake duct 94.

A supply of fuel is conducted to the fuel injection nozzle device 122 by the conduit 124 while an oxidizing fluid may at the same time be supplied to the nozzle device 126 from the oxidizer tank 86 aforementioned. The nozzle devices 122 and 126 are therefore positioned relative to each other as shown in FIGURE 12 so as to discharge a rocket fuel and oxidizer forming a combustible mixture at the spark plug device 120 which will be ignited to produce combustion. When so operative the inflow of air through the intake duct 94 is cut-off by means of a valve or shutter element 128 as shown in FIGURES 11 and 13. The shutter element 128 is pivotally mounted by the shaft 130 at the outlet end of the intake duct so as to be positioned between the closed position shown by solid line in FIGURE 11 and the open position shown by dotted line. The opposite axial ends of the shaft 130 are journaled by bearings 132 within the journal bosses 134 and 136 projecting from the tubular member 88 as more clearly shown in FIGURE 13. A shutter operating lever 138 is connected to one end of the shaft 130 so that the shutter element 128 may be displaced between its closed and open positions to change the operational condition of the engine.

Inasmuch as the engine 78 illustrated in FIGURES 7 through 13 is of the non-rotatable type, the exhaust nozzles 100 are provided with the axially extending sections 102 so that the discharge therefrom will produce axial thrust. Except for the axially extending sections 102, the exhaust nozzles 100 are otherwise similar in construction and arrangement to the exhaust nozzles 24 hereinbefore described in connection with the engine 10. The portions of the exhaust nozzles 100 that extend into the tubular member 88 are therefore elliptical in cross-section and diverge in the direction of exhaust flow. Also, the exhaust nozzles 100 terminate internally of the tubular member 88 at a reference stage line at which the outlet ends of the intake ducts also terminate. The intake ducts also include portions which enter the tubular member that are similar in construction and arrangement to the intake ducts 22 hereinbefore described in connection with the engine 10. However, the intake ducts 94 include the axially extending sections 96 which receive an inflow of air as a result of forward movement of the engine with the vehicle to which it is attached, the inflow of air emerging from the outlet end of the intake ducts when the shutter elements 128 are in the open position. The engine 78 may therefore be operated either as a jet engine wherein only fuel supplied through the fuel injection nozzle 122 is mixed with the inflow of air, or as a rocket engine wherein the fuel is mixed with the oxidizer and the intake ducts are closed by the shutter elements 128.

High performance operation of the engine 78 may be accomplished under starting conditions as a rocket engine until sufficient flow velocity of the combustion products within the toroidal combustion chamber 90 has been attained. Jet operation may then be effected by opening the shutter elements 128 and cutting off the supply of oxidizer. Rocket engine operation may again be resumed at high altitudes for example for relatively short periods of time. With regard to the rotating type of engine 10, a relatively low thrust will be initially produced. However, because of the continuous flow of combustion products and the regenerative combustion cycling operation, a high thrust is developed. The engine 10 could also be modified by ducting of the intake and exhaust nozzles in order to produce jet turbine operation. Further, it will be appreciated that the number of intake ducts and exhaust nozzles utilized will depend upon the size and power requirements of the engine. Also, the location and mounting of the engines may be varied. For example, the rotatable jet engines with propellers could be mounted for aircraft propulsion purposes while smaller versions thereof without propellers could be mounted for land vehicle propulsion purposes. The non-rotatable type of engine could be mounted as external nacelles on the wings of an aircraft or larger versions of this type engine may be mounted on the aft section of an aircraft. Further, the non-rotatable engines should be utilized in pairs arranged so that the toroidal flow of combustion products occur in opposite directions within the respective engines of each pair, in order to balance torque.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combustion jet engine comprising, an endless tubular member forming a combustion chamber having a continuous flow path of constant cross-sectional area, a plurality of spaced exhaust nozzles connected to the tubular member and extending therefrom at an acute angle to the flow path, a plurality of spaced intake ducts connected to said tubular member at an acute angle to the flow path and projecting into the combustion chamber in overlapping relation to the exhaust nozzles to form spaced flow restriction zones within said combustion chamber, each restriction zone having a converging section formed by the intake duct, a diverging section formed by the exhaust nozzle and a throat section where the intake duct and exhaust nozzle overlap, fuel supply means mounted in each of the diverging sections of the restriction zones for injecting fuel into an inflow of air entering the combustion chamber from the intake ducts, ignition means mounted in each of the diverging sections downstream of the fuel supply means for producing combustion, and baffle means mounted by the tubular member in each of the diverging sections for deflecting combustion back flow into the flow path of combustion products.

2. The combination of claim 1 wherein said tubular member is a torus having an axis about which a circular flow path is formed for said combustion products.

3. The combination of claim 2 wherein the fuel supply means and ignition means are mounted by the baffle means within the diverging sections of the restriction zones.

4. The combination of claim 3 wherein the intake ducts and exhaust nozzles are elliptical in cross-sections within the tubular member.

5. The combination of claim 4 including means mounting said tubular member for rotation about said axis in response to discharge of combustion products from the exhaust nozzles.

6. The combination of claim 5 wherein said mounting means include propeller blades rotatable with the tubular member producing axial thrust in a direction perpendicular to said flow path.

7. The combination of claim 1 including means mounting said tubular member for rotation in response to discharge of combustion products from the exhaust nozzles.

8. The combination of claim 7 wherein said mounting means include propeller blades rotatable with the tubular member producing axial thrust in a direction perpendicular to said flow path.

9. The combination of claim 1 wherein the fuel supply means and ignition means are mounted by the baffle means within the diverging sections of the restriction zones.

10. The combination of claim 1 wherein the intake ducts and exhaust nozzles are elliptical in cross-sections within the tubular member.

11. The combination of claim 1 wherein said intake ducts and exhaust nozzles extend in opposite directions away from the tubular member perpendicular to said flow path.

12. In a combustion engine having a tubular member enclosing an annular flow passage, injection means connected to the tubular member for introducing a combustible mixture to the annular flow passage, and ignition means mounted by the tubular member in spaced relation to the fuel injection means for producing a flow of combustion products through the flow passage along a continuous flow path, wherein the improvement comprises; exhaust means diverting a portion of said flow of combustion products from the annular flow passage upstream of the fuel injection means at an acute angle to said continuous flow path, and flow restriction means formed in the annular flow passage for increasing the flow velocity of combustion products approaching the exhaust means and the injection means.

13. The combination of claim 12 wherein said injecting means comprises, an intake duct projecting into the tubular member at an acute angle to the flow path, baffle means for preventing back flow into the intake duct in response to ignition of the combustible mixture and fuel supply means introducing fuel between the intake duct and the ignition means.

14. A combustion jet engine comprising, an endless tubular member forming a combustion chamber, spaced flow restriction means mounted internally of the tubular member forming throat sections through which combustion products flow, fuel injection means for introducing fuel downstream of each throat section, ignition means producing flow of said combustion products through said chamber in a continuous flow path, intake means through which an inflow of air is induced upstream of the fuel injection means in response to said flow of combustion products and exhaust means spaced upstream from the intake means for partially diverting flow of the combustion products at an acute angle to said flow path.

15. The combination of claim 14 wherein said flow restriction means comprises portions of the intake means and the exhaust means that extend into the tubular member and overlap along said continuous flow path.

References Cited
UNITED STATES PATENTS

| | | | |
|---|---|---|---|
| 2,481,235 | 9/1949 | Parr | 60—39.34 |
| 2,927,426 | 3/1960 | Welsh | 60—39.35 |

RALPH D. BLAKESLEE, *Primary Examiner.*